United States Patent [19]

Brown et al.

[11] Patent Number: 5,062,962

[45] Date of Patent: Nov. 5, 1991

[54] METHODS OF CONTROLLING SCALE FORMATION IN AQUEOUS SYSTEMS

[75] Inventors: J. Michael Brown, The Woodlands; John F. McDowell, Spring, both of Tex.; Kin-Tai Chang, Columbus, Ga.

[73] Assignee: Betz Laboratories, Inc., Trevose, Pa.

[21] Appl. No.: 518,045

[22] Filed: May 4, 1990

[51] Int. Cl.$^5$ ............................................. C02F 5/10
[52] U.S. Cl. ..................................... 210/698; 252/180
[58] Field of Search ............................... 210/698–701; 252/180, 181

[56] References Cited

U.S. PATENT DOCUMENTS

| | | | |
|---|---|---|---|
| 3,463,730 | 8/1969 | Booth et al. | 210/701 |
| 3,769,223 | 10/1973 | Pearson et al. | 252/89 |
| 3,776,850 | 12/1973 | Pearson et al. | 252/89 |
| 3,856,755 | 12/1974 | Vogt et al. | 210/698 |
| 4,457,847 | 7/1984 | Lorenc et al. | 210/701 |
| 4,561,982 | 12/1985 | Kuriyama et al. | 210/698 |
| 4,654,159 | 3/1987 | Bush et al. | 252/59 |
| 4,673,508 | 6/1987 | Coleman et al. | 210/701 |
| 4,687,592 | 8/1987 | Collins et al. | 252/99 |
| 4,846,650 | 7/1989 | Benedict et al. | 424/55 |
| 4,936,987 | 6/1990 | Persinski et al. | 210/701 |
| 4,937,002 | 6/1990 | Bainbridge et al. | 210/701 |

FOREIGN PATENT DOCUMENTS 2408591  9/1975  Fed. Rep. of Germany .

OTHER PUBLICATIONS

"Chemistry and Industry", H. Cohen and J. D. Mier, pp. 349–350, 1965.
"Journal of Organic Chemistry", Payne and Williams, vol. 24, p. 54, 1959.
*Betz Handbook of Industrial Water Conditioning*, 8th ed., pp. 177–179, 1980.

*Primary Examiner*—Peter Hruskoci
*Attorney, Agent, or Firm*—Alexander D. Ricci; Steven D. Boyd

[57] ABSTRACT

A method of treating water to inhibit the formation of scale is disclosed. The method is particularly effective at inhibiting the formation and deposition of calcium and barium scales in circulating aqueous systems such as cooling water systems. The method comprises introducing into the aqueous system a polyepoxysuccinic acid of the general formula

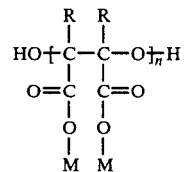

where n ranges from about 2 to about 11, M is hydrogen or a water soluble cation such as $Na^+$, $NH_4^+$, or $K^+$ and R is hydrogen, $C_{1-4}$ alkyl or $C_{1-4}$ substituted alkyl.

18 Claims, No Drawings 5,062,962

METHODS OF CONTROLLING SCALE FORMATION IN AQUEOUS SYSTEMS

FIELD OF THE INVENTION

The present invention relates to the treatment of water to inhibit the formation of scale. More particularly, the present invention relates to the use of a polyepoxysuccinic acid to inhibit scale formation in aqueous systems.

BACKGROUND OF THE INVENTION

Although the present invention has generally applicability to any given system where the formation and deposition of calcium scale and in particular calcium carbonate scale is a potential problem, the invention will be discussed in detail as it concerns cooling water systems. The present invention relates to methods for inhibiting scale deposits in aqueous systems.

In industrial cooling systems, water such as from rivers, lakes, ponds, etc., is employed as the cooling media for heat exchangers. Such natural waters contain large amounts of suspended materials such as silt, clay, and organic wastes. The cooling water from heat exchangers is typically passed through a cooling tower, spray pond or evaporative system prior to discharge or reuse. In the systems, the cooling effect is achieved by evaporating a portion of the water passing through the system. Because of the evaporation which takes place during cooling, suspended materials in the water become concentrated. Fouling materials from the feedwater or as a result of evaporative concentration can settle in locations of low flow rates and cause corrosion and inefficient heat transfer Agglomerating agents such as polyacrylamides and polyacrylates have been used to agglomerate fine particles of mud and silt into a loose floc for removal. However, these flocs tend to settle in cooling tower basins and frequent cleaning is necessary to remove the settled flocs from the tower basins.

The water employed in industrial cooling water systems also often contains dissolved salts of calcium and magnesium, etc., which can lead to scale and sludge deposits. One of the most common scale deposits in cooling water systems is calcium carbonate. It normally results from the breakdown of calcium bicarbonate, a naturally occurring soluble salt. Calcium carbonate has a relatively low solubility and its solubility decreases with increasing temperature and pH. Thus, the rate of calcium carbonate deposition increases with increasing pH and temperature.

Deposit control agents such as phosphates, phosphonates and polyacrylates are often used to inhibit calcium carbonate scale formation in industrial cooling water systems. The use of polyacrylates alone is not effective at high calcium concentrations because undesireable polyacrylate-calcium adducts are formed reducing efficiency.

Although phosphonates are very effective at controlling calcium carbonate scale formation, they can produce insoluble phosphonate - calcium complexes or calcium phosphate scale upon degradation. Further, current limits on phosphate discharge limit the acceptability of the use of phosphonates for water treatment. Certain phosphonates exhibit excellent calcium tolerance, that is the ability to inhibit calcium carbonate scale in waters having a propensity toward scale deposition. One method of estimating a systems deposition potential is the Langelier saturation index. The Langelier saturation index (LSI) is a qualitative indication of the tendency of calcium carbonate to deposit or dissolve. A full description of the LSI is given at pages 177 through 178 of the Betz Handbook of Industrial Water Conditioning, 8th Edition 1980 Incorporated herein by reference. Other methods of estimating conditions where scale formation is likely are known, such as the Ryzner stability index.

Preventing the corrosion and scaling of industrial heat transfer equipment is essential to the efficient and economical operation of a cooling water system. Excessive corrosion of metallic surfaces can cause the premature failure of process equipment, necessitating downtime for the replacement or repair of the equipment. Additionally, the buildup of corrosion products on heat transfer surfaces impedes water flow and reduces heat transfer efficiency, thereby limiting production or requiring downtime for cleaning. Reduction in efficiency will also result from scaling deposits which retard heat transfer and hinder water flow.

Scale can also cause rapid localized corrosion and subsequent penetration of metallic surfaces through the formation of differential oxygen concentrations cells. The localized corrosion resulting from differential oxygen cells originating from deposits is commonly referred to as "underdeposit corrosion".

SUMMARY OF THE INVENTION

The present invention provides an effective method for inhibiting scale formation in aqueous systems. The present invention is effective at conditions of high pH, high calcium concentration and high M-alkalinity where conventional calcium control treatments lose efficacy. The treatment of the present invention also controls calcium scale formation without forming undesirable inhibitor-calcium complexes. Also, the method of the present invention does not employ phosphorus thereby eliminating the undesirable discharge of phosphorus-containing compounds. The method of the present invention provides calcium carbonate inhibition efficacy superior to most prior art polyacrylates and phosphonates in waters having LSI numbers from 0 to 3.5 and even in waters having relatively high LSI numbers, that is in the range 2.5 to 3.0. The method of the present invention allows industrial cooling water systems to operate at higher cycles of concentration, acid feed for pH control can be reduced and phosphorus limited systems can be treated effectively. In addition to treating waters having high calcium levels, the present invention is also effective at treating waters having low levels of calcium.

The present invention is effective at inhibiting the deposition of calcium oxalate, calcium sulfate, barium sulfate as well as the more common calcium carbonate. The present invention is also effective at high pH calcium carbonate inhibition as required in paper mills. The treatment of the present invention exhibits an improved tolerance to the presence of iron in the system in comparison to prior art treatments such as polyacrylic acid or hydroxyethylidene diphosphonic acid. The present invention may be used in combination with known dispersants.

The method of the present invention comprises treating industrial waters with a polyepoxysuccinic acid (hereinafter PESA) of the general formula

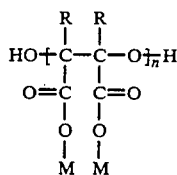

where n ranges from about 2 to 50, preferably 2 to 25, M is hydrogen or a water soluble cation such as Na+, NH$_4$+ or K+ and R is hydrogen, C$_{1-4}$ alkyl or C$_{1-4}$ substituted alkyl (preferably R is hydrogen).

A method of preparing a polyepoxysuccinic acid similar to that employed as a scale control agent in the present invention is decribed in U.S. Pat. No. 4,654,159 Bush et al. The Bush et al. patent describes ether hydroxypolycarboxylate prepared from epoxysuccinates by treatment with an alkaline calcium compound. The polyepoxysuccinic acid of a specific molecular weight distribution is described in Bush et. al. as a useful detergent builder due to its ability to act as a sequestering agent. The sequestering agent of Bush et al. complexes with hardness cations in water supplies which aids in detergent processes by preventing the cations from adversely effecting the detergents.

In the present invention, the polyepoxysuccinic acids are added to aqueous systems at substoichiometric levels to inhibit scale formation. The method of the present invention provides effective calcium carbonate deposition inhibition in waters having relatively high Langelier saturation indexes. The method of the present invention provides such control at relatively low active treatment levels without the use of phosphates or phosphonates.

DESCRIPTION OF THE PREFERRED EMBODIMENTS

The present invention pertains to a novel method of inhibiting the formation of scale such as calcium scale from aqueous systems. Specifically, the method of the present invention comprises adding to an aqueous system a polyepoxysuccinic acid of the general formula

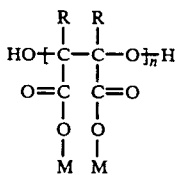

where n ranges from about 2 to about 50, preferably 2 to 25 and M is hydrogen or a water soluble cation such as Na+, NH$_4$+ or K+ and R is hydrogen, C$_{1-4}$ alkyl or C$_{1-4}$ substituted alkyl (preferably R is hydrogen).

Polyepoxysuccinic acids were found to provide calcium scale inhibition comparable to prior art phosphates, phosphonates and polyacrylates without the recognized limitations of these prior art treatments. The method of the present invention was found to be effective in all water systems, and particularly effective in aqueous systems having relatively high LSI numbers, that is in the range 2.5 to 3.0. The polyepoxysuccinic acid material employed in the present invention can be obtained by the polymerization of epoxysuccinate in the presence of calcium hydroxide or other alkaline calcium salts. The general reaction can be represented as follows:

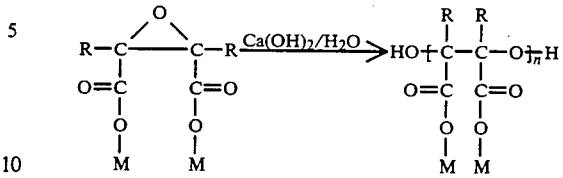

A complete description of a method of preparing such a polyepoxysuccinic acid of a specific molecular weight distribution is included in U.S. Pat. No. 4,654,159 incorporated herein by reference.

The treatment levels of polyepoxysuccinic acid added to an aqueous system can range from about 25 parts per billion up to about 500 parts per million. The preferred treatment levels range from about 50 ppm up to about 100 ppm. The concentration of polyepoxysuccinic acid necessary to provide effective calcium control will, of course, vary from system to system. The treatment level will vary, in part, with changes in temperatures, pH, and LSI. However, in all cases, the concentration of polyepoxysuccinic acid added to an aqueous water system in accordance with the present invention is at substoichiometric concentrations. That is, the concentration of polyepoxysuccinic acid added is much lower than the concentration of the scale forming material in the system to be treated.

The present invention will now be further described with reference to a number of specific examples which are to be regarded solely as illustrative and not as restricting the scope of the present invention.

In the examples and tables which follow, abbreviations and trade names have been used to identify the samples tested. The following legend identifies the tradenames and gives the chemical name and commercial source for the samples.

PESA: polyepoxysuccinic acid;

Bayhibit AM: 2-phosphobutane 1,2,4 - tricarboxylic acid; Mobay Chemical Co.

Belclene 500: copolymer of hypophosphite and acrylic acid; Ciba-Geigy Corp.

Dequest 2054: hexamethylenediamine tetra(methylphosphonic acid); Monsanto Co.

Belclene 200. Polymaleic acid; Ciba-Geigy Corp.

GoodRite K-732: polyacrylic acid; B. F. Goodrich Chemical Co.

GoodRite K-752: polyacrylic acid; B. F. Goodrich Chemical Co.

HEDP: 1-hydroxyethylidene 1,1-diphosphonic acid; Monsanto Co.

Cyanamer P-80: polyacrylamide; American Cyanamid Co.

Betz HPS I: 3:1 acrylic acid/allyl hydroxypropylsulfonate ether sodium salt copolymer; Betz Laboratories, Inc.

Betz MHC: 6:1 acrylic acid/allyl hydroxypropylsulfonate ether sodium salt copolymer; Betz Laboratories, Inc.

Belcor 575: hydroxyphosphonocarboxylic acid; Ciba-Geigy Corp.

CMOS: carboxymethoxysuccinate;

ODS: 2,2'-oxodissuccinate

Triton CF10: octylphenoxy-poly(ethoxy)ethanol: Rohm and Haas Co.

Coag 88D: polyacrylic acid: Betz Laboratories, Inc.

EXAMPLE 1

Table 1 summarizes static calcium carbonate inhibition testing for polyepoxysuccinic acid as well as several prior art calcium carbonate control agents at varying treatment levels and at varying LSI levels. The tests were performed by adding the treatment (sample) to a calcium solution of the described conditions. Sodium carbonate, adjusted to pH 9.0, was added and the mixture incubated at 70° C. After cooling, a measured portion was filtered and the pH adjusted to less than 2.0 with hydrochloric acid. The mixture was diluted and the pH adjusted to 12 with sodium hydroxide. A calcium indicator, murexide, was added and the solution titrated to a purple-violet endpoint with ethylene diaminetetraacetic acid. From titrations for the treated, stock and control solution the % inhibition was calculated. The conditions of the test were: 220 ppm Ca as $CaCO_3$, 234 ppm $CO_3$ as $CaCO_3$, pH 8.5, Temp 70° C. at LSI 1.8; 551 ppm Ca as $CaCO_3$, 585 ppm $CO_3$ as $CaCO_3$, pH 8.5, Temp. 70° C. at LSI 2.5; 1102 ppm Ca as $CaCO_3$, 1170 ppm $CO_3$ as $CaCO_3$, pH 9.0, Temp. 70° C. at LSI 3.2. Table 1 shows that at higher LSI values, polyepoxysuccinic acid out performs the prior art calcium control agents when treatment levels exceed about 2 parts per million. At lower LSI values, polyepoxysuccinic acid is at least as effective as the prior art control agents at treatment levels greater than about 1 part per million.

TABLE 1

Static Calcium Carbonate Inhibition

| Sample | ppm Active | LSI 1.8 | LSI 2.5 | LSI 3.2 |
|---|---|---|---|---|
| PESA | 0.05 | 39.9 | 0.0 | 3.8 |
|  | 0.1 | 50.9 | 25.2 | 3.5 |
|  | 0.5 | 86.5 | 63.3 | 2.6 |
|  | 1.0 | 89.4 | 95.0 | 27.7 |
|  | 2.0 | 89.4 | 97.1 | 42.6 |
|  | 5.0 | 92.2 | 96.6 | 92.4 |
|  | 10.0 | 90.5 | 96.4 | 97.7 |
| HEDP | 0.05 | 44.9 | 42.0 | 5.5 |
|  | 0.1 | 57.3 | 68.2 | 6.4 |
|  | 0.5 | 89.3 | 97.1 | 54.0 |
|  | 1.0 | 95.1 | 99.3 | 73.4 |
|  | 2.0 | 94.1 | 97.7 | 74.8 |
|  | 5.0 | 89.6 | 96.4 | 75.4 |
|  | 10.0 | 81.2 | 92.5 | 76.1 |
| GoodRite K-732 | 0.05 | 25.9 | 8.3 | — |
|  | 0.1 | 37.1 | 13.6 | — |
|  | 0.5 | 61.5 | 63.5 | 8.0 |
|  | 1.0 | 75.1 | 78.5 | 28.2 |
|  | 2.0 | — | — | 59.3 |
|  | 5.0 | 98.6 | — | 71.4 |
|  | 10.0 | — | — | 74.4 |

EXAMPLE 2

Table 2 summarizes the result of static calcium carbonate inhibition testing which compares polyepoxysuccinic acid to a number of prior art calcium carbonate inhibitors at varying treatment levels at a relatively high LSI number. Test procedures were the same as in Example 1 described above. The conditions of the test were: 1102 ppm Ca as $CaCO_3$; 1170 ppm $CO_3$ as $CaCO_3$, pH 9.0, Temp. 70° C. and LSI 3.2. As shown in Table 2, at treatment levels of 10 parts per million polyepoxysuccinic acid was at least as effective as all of the prior art calcium carbonate control agents at the high LSI level of this test.

TABLE 2

Static Calcium Carbonate Inhibition

| Sample | % Inhibition | | |
|---|---|---|---|
|  | 2 ppm | 5 ppm | 10 ppm |
| PESA | 43.3 | 86.1 | 96.5 ± 2.8% |
| Bayhibit AM | 85.1 | 86.5 | 93.6 |
| Belclene 500 | 59.4 | — | 93.3 |
| Dequest 2054 | 77.3 | — | 91.2 |
| Belclene 200 | 66.0 | — | 83.2 |
| GoodRite K-752 | 62.9 | 71.4 | 80.6 |
| HEDP | 75.1 | 75.2 | 78.3 |
| Cyanamer P-80 | 54.1 | — | 73.2 |
| Betz MHC | 53.0 | 60.6 | 66.8 |
| Belcor 575 | 22.9 | — | 66.5 |

EXAMPLE 3

Table 3 summarizes the results of static calcium carbonate inhibition testing for polyepoxysuccinic acid and a number of compounds that contain functional fragments of the polyepoxysuccinic acid structure. Polyepoxysuccinic acid is a low molecular weight oligomer of oxysuccinic acid with hydroxyl end groups. Succinic acid and ODS are equivalent to monomer and dimer molecules without the hydroxy end groups. Other compounds with structures similar to polyepoxysuccinic acid with hydroxyl functionalities were also tested. The test procedures were as described above in example 1. The conditions of the test were: 1102 ppm Ca as $CaCO_3$; 1170 ppm $CO_3$ as $CaCO_3$, ph 9.0, Temp. 70° C. and LSI 3.2. As shown in Table 3, only polyepoxysuccinic acid exhibits any significant calcium carbonate inhibition efficacy.

TABLE 3

Calcium Carbonate Inhibition of PESA Fragments

| Sample | % Inhibition | | |
|---|---|---|---|
|  | 2 ppm | 5 ppm | 10 ppm |
| PESA | 44.5 | 91.2 | 95.7 |
| CMOS | 5.6 | 3.6 | 2.6 |
| ODS | 1.1 | 7.8 | 12.6 |
| Epoxysuccinic Acid | 2.6 | 2.6 | 1.8 |
| Succinic Acid | 1.0 | 0.8 | 0.0 |
| 2-Ethoxyethyl Ether | 0.5 | 0.5 | −1.1 |
| Ethylene Glycol Diformate | 0.6 | 1.2 | 0.5 |
| Glycolic Acid | 0.2 | 0.8 | 0.7 |
| Malic Acid | 1.7 | 2.8 | 3.3 |
| Diglycolic Acid | 2.8 | 3.4 | 4.5 |
| Tartaric Acid | 3.8 | 5.3 | 6.1 |
| 4-Hydroxybutyric Acid | −0.8 | −2.0 | −1.7 |
| 1,2,3,4-Butane Tetracarboxylic Acid | 7.9 | 11.4 | 12.6 |
| Glucaric Acid | 4.2 | 5.1 | 4.5 |
| Glutaric Acid | −0.2 | 0.5 | −0.3 |
| Dihydroxy Fumaric Acid | 2.2 | 2.8 | 0.5 |
| Butane Tetrol | −0.8 | −2.0 | −1.1 |
| Oxalacetic Acid | 2.2 | 3.7 | 2.4 |
| 1,3-Dihydroxyacetone Dimer | −2.8 | −2.8 | −2.1 |
| Triethylene Glycol | −0.3 | −0.2 | −1.1 |
| Poly(Ethylene Glycol) MW = 400 | −1.5 | −3.1 | −1.8 |
| Poly(Ethylene Glycol) MW = 2000 | 1.2 | 0.8 | −3.0 |
| Poly(Propylene Glycol) MW = 725 | 1.3 | −0.8 | −3.8 |

EXAMPLE 4

Table 4 summarizes data with respect to the calcium tolerance of polyepoxysuccinic acid and several prior art calcium carbonate control agents. In this test, 100 parts per million of each treatment was added to a 1.0 molar calcium chloride solution and the turbidity (as percent light transmittance at 415 nm) was measured. Turbidity would be a result of the formation of an insoluble complex of the treatment with calcium ions. One of the most calcium tolerant commercial phosphonate product for calcium carbonate inhibition is Bayhibit AM. As shown in Table 4, polyepoxysuccinic acid as well as Betz MHC exhibited a significantly lower turbidity which indicates high calcium tolerance.

TABLE 4

Calcium Tolerance

| Conditions: | 0.1M CaCl$_2$ | pH 9.0 | Temp. 70° C. |
|---|---|---|---|
| | 100 ppm Treatment | Indv. ph Adjusted | |
| Sample | Appearance | | % Transmittance (415 nm) |
| PESA | Clear | | 99.0 |
| Bayhibit AM | Turbid (Floc) | | 75.5 |
| GoodRite K-752 | Mod. Turbid | | 84.5 |
| Betz MHC | Clear | | 98.0 |

EXAMPLE 5

Table 5 summarizes the data from dynamic recirculator tests run at a high LSI (about 3.0) and pH 8.8 to 9.0. Polyepoxysuccinic acid was tested at concentrations ranging from 20 parts per million up to 60 parts per million active. In order to evaluate the efficacy of the treatment of the present invention as corrosion and scale control agents for cooling water systems, tests were conducted in a Recirculator Test System. The recirculator system is designed to provide a realistic measure of the ability of a treatment to prevent corrosion and fouling under heat transfer conditions. In this system treated water is circulated by a centrifugal pump through a corrosion coupon by-pass rack, into which corrosion coupons (admiralty brass or mild steel) are inserted, and past a mild steel or 316 stainless steel heat exchanger tube contained in a plexiglass block. The heat exchanger tube is fitted with an electrical heater so that the heat load on the tube can be varied and controlled in the 0 to 16,000 BTU/ft$^2$/hr range. The water velocity past the corrosion coupons and heat exchanger tube is equivalent at any given flow rate and can be controlled anywhere from 0 to 4.5 ft/sec.

The pH and temperature of the circulating water are automatically controlled. The treated water is prepared by chemical addition to deionized water. Provisions for continuous makeup and blowdown are made by pumping fresh treated water from supply tanks to the sump of the unit, with overflow from the sump serving as blowdown. The total system volume is about 12 liters. As can be seen from Table 5, at 30 parts per million active treatment level, polyepoxysuccinic acid maintained effective control of heat transfer deposition and bulk water turbidity. At 20 parts per million active treatment levels, some loss of efficacy was noted at the harsh conditions of this test. Also, the combination of PESA and certain compounds e.g., Coag 105 and Triton CF-10 exhibited a loss of efficacy indicating an undesirable interaction.

TABLE 5

Dynamic CaCO$_3$ Inhibition (LSI 3.0)

| Conditions: | 600 ppm Ca as CaCO$_3$ | ph 8.8-9.0 | 8000 btu/hr-ft$^2$ 316 Stainless |
|---|---|---|---|
| | 200 ppm Mg as CaCO$_3$ | M Alk-500 ppm as CaCO$_3$ | 4 gpm Temp 120° F. |
| | 630 ppm NaHCO$_3$ | | |
| Treatment - ppm | Final Turbidity | Tube CaCO$_3$ | System Fouling | Dur. (dy) |
| PESA - 60 | 1.7 ntu | V.Slight 0.5 mg | Slight | 7 |
| PESA - 60 | 0.9 | Slight | Moderate | 6 |

TABLE 5-continued

Dynamic CaCO$_3$ Inhibition (LSI 3.0)

| Conditions: | 600 ppm Ca as CaCO$_3$ | ph 8.8-9.0 | 8000 btu/hr-ft$^2$ 316 Stainless |
|---|---|---|---|
| | 200 ppm Mg as CaCO$_3$ | M Alk-500 ppm as CaCO$_3$ | 4 gpm Temp 120° F. |
| | 630 ppm NaHCO$_3$ | | |
| Treatment - ppm | Final Turbidity | Tube CaCO$_3$ | System Fouling | Dur. (dy) |
| PESA - 40 | 1.1 | 0.5 mg Clean | Slight | 7 |
| PESA - 30 | 1.2 | <0.5 mg V. Slight | Slight | 7 |
| PESA - 20 | 2.5 | 0.5 mg Slight | Moderate | 7 |
| PESA - 20 Triton CF10 - 5 | 6.3 | Moderate | Slight | 7 |
| PESA - 30 Coag 105 - 30 | 73.9 | 5.0 mg Moderate | Moderate | 2 |
| HEDP - 6 Coag 105 - 50 | 17.5 | 6.2 mg Clean | Slight | 3 |
| GoodRite K-752-60 | 3.5 | <0.5 mg Moderate 6.5 mg | Heavy | 3 |

EXAMPLE 6

Table 6 summarizes data with respect to the chlorine tolerance of polyepoxysuccinic acid and several prior art calcium carbonate control agents. The present inhibition values for 10 ppm inhibitor are reported for 0,2,5 and 10 ppm chlorine. The test conditions were: 1102 ppm Ca as CaCO$_3$, 1170 ppm CO$_3$ as CaCO$_3$, pH 9.0, Temp. 70° C., LSI 3.2. As shown in Table 6, at 10 ppm added chlorine, PESA and Bayhibit AM maintained 99% of their original efficacy while HEDP and polyacrylic acid maintained less of their original efficacy.

TABLE 6

Chlorine Tolerance

| | Percent Inhibition | | | |
|---|---|---|---|---|
| ppm Chlorine | PESA | Bayhibit AM | HEDP | GRK-752 |
| 0 | 92.8 | 92.4 | 79.7 | 80.7 |
| 2 | 92.4 | 92.2 | 71.2 | 78.5 |
| 5 | 93.0 | 91.7 | 68.7 | 81.0 |
| 10 | 91.9 | 91.6 | 63.7 | 78.0 |

EXAMPLE 7

Table 7 summarizes data with respect to the iron tolerance of polyepoxysuccinic acid and several prior art calcium carbonate control agents. The percent inhibition values for 5 ppm inhibitor are reported for 0,1,5 and 10 ppm iron III. The test conditions were: 1102 ppm Ca as CaCO$_3$, 1170 ppm CO$_3$ as CaCO$_3$, pH 9.0, Temp. 70° C. LSI 3.2.

As shown in Table 7, at 5 ppm active inhibitor and 10 ppm iron III, PESA maintained 55% efficacy, Bayhibit AM maintained 53% efficacy and HEDP and polyacrylic acid much less.

TABLE 7

Iron Tolerance

| | Percent Inhibition | | | |
|---|---|---|---|---|
| ppm Fe$^{+3}$ | PESA | Bayhibit AM | HEDP | GRK-752 |
| 0 | 69.2 | 90.9 | 70.4 | 60.7 |
| 1 | 55.3 | 78.0 | 72.6 | 62.1 |
| 5 | 46.1 | 65.3 | 52.9 | 16.6 |
| 10 | 37.9 | 48.1 | 9.8 | 9.1 |

EXAMPLE 8

Table 8 summarizes data with respect to calcium sulfate inhibition testing for PESA as well as several prior art calcium scale control agents at varying treatment levels. While calcium sulfate is not common in cooling systems, it is encountered frequently in general process applications such as scrubbers, oil field brines, and paper processes. The percent inhibition values for 1,3,5 and 10 ppm active inhibitor are reported. Test conditions were: 2000 ppm Ca; 4800 ppm $SO_4$, pH 7.0 and Temp 50° C. While slightly less efficacious than AMP (aminotri(methylene phosphonic acid)) and polyacrylic acid, PESA exhibited significant efficacy at the higher treatment levels.

TABLE 8

| | Calcium Sulfate Inhibition | |
|---|---|---|
| Sample | ppm Active | % Inhibition |
| PESA | 1 | 15.8 |
| | 3 | 38.6 |
| | 5 | 72.4 |
| | 10 | 91.5 |
| AMP | 1 | 35.5 |
| | 3 | 96.3 |
| | 5 | 98.6 |
| | 10 | 98.5 |
| GRK-732 | 1 | 56.3 |
| | 3 | 97.7 |
| | 5 | 99.2 |
| | 10 | 99.5 |

EXAMPLE 9

Table 9 summarizes data with respect to calcium phosphate inhibition testing for PESA and HPS I at varying treatment levels. PESA exhibited minimal efficacy which seems to decline with increasing treatment levels. Test conditions were: 300 ppm Ca as $CaCO_3$, 6 ppm $PO_4$, pH 7.5 and Temp. 70° C.

TABLE 9

| | Calcium Phosphate Inhibition | |
|---|---|---|
| Sample | ppm Active | % Inhibition |
| PESA | 5 | 21.2 |
| | 10 | 19.4 |
| | 20 | 13.4 |
| HPS I | 5 | 43.7 |
| | 10 | 86.2 |
| | 20 | 97.4 |

EXAMPLE 10

Table 10 summarizes data with respect to barium sulfate inhibition testing for PESA and hexametaphosphate (which is a known barium sulfate inhibitor) at varying treatment levels. The test conditions were: 2 ppm Ba, 1000 ppm $SO_4$, pH 5.5 and Temp. 60° C. As shown in Table 10 PESA is superior to hexametaphosphate at low treatment levels.

TABLE 10

| | Barium Sulfate Inhibition | |
|---|---|---|
| Treatment | ppm Active | % Inhibition |
| hexametaphosphate | 1.0 | 63.6 |
| | 2.5 | 83.2 |
| | 5.0 | 100.0 |
| PESA | 1.0 | 94.4 |
| | 1.0 | 91.6 |
| | 2.5 | 100.0 |
| | 2.5 | 100.0 |
| | 5.0 | 100.0 |

TABLE 10-continued

| | Barium Sulfate Inhibition | |
|---|---|---|
| Treatment | ppm Active | % Inhibition |
| | 5.0 | 100.0 |

EXAMPLE 11

Table 11 summarizes data with respect to a high pH calcium carbonate inhibition test which compares PESA to AMP (a known calcium carbonate inhibitor for such conditions in the paper industry). The test conditions were: 60 ppm Ca as Ca, 1000 ppm $CO_3$ as $CO_3$, pH 12.5, Temp. 70° C. At treatment levels of 50 ppm active PESA is as effective as AMP.

TABLE 11

| | High pH Calcium Carbonate Inhibition | |
|---|---|---|
| Treatment | ppm Active | % Inhibition |
| AMP | 2 | 80.8 |
| | 10 | 95.7 |
| | 50 | 89.9 |
| PESA | 2 | — |
| | 2 | 4.7 |
| | 10 | 13.6 |
| | 10 | 9.7 |
| | 50 | 88.6 |
| | 50 | 88.5 |

EXAMPLE 12

Table 12 summarizes data with respect to calcium carbonate inhibition in a recirculator testing system as described in Example 5. The test conditions were: 600 ppm Ca as $CaCO_3$, 200 ppm Mg as $CaCO_3$, 358 ppm $NaHCO_3$, pH 8.5, M alk 250, Temp 120° F., 316 stainless steel tube heat flux 15,600 btu/hr. $ft^2$, flow rate 3 gpm, LSI 2.5. A treatment level of 25 ppm PESA performed comparable to a prior art treatment of 3 ppm HEDP and 15 ppm Betz MHC.

TABLE 12

| | Dynamic $CaCO_3$ Inhibition | | | |
|---|---|---|---|---|
| Treatment | Turbidity | Tube $CaCO_3$ | System Fouling | Duration (Days) |
| 3 ppm HEDP + 15 ppm Betz MHC | 0.42 | Clean 0.75 mg | Very Slight | 7 |
| 25 ppm PESA | 0.43 | Clean 0.0 mg | Very Slight | 7 |

EXAMPLE 13

Table 13 summarizes data with respect to calcium carbonate inhibition in a bench scale condenser. The bench scale condenser consisted of a 304 stainless steel shell into which a tube of the desired metallurgy was inserted forming a tube-in-shell condenser arrangement. A pressure transducer was connected to the shell. Heat was provided by heaters mounted in the condenser shell. Water was circulated through the condenser into a small heat exchanger to remove heat before the water was returned to the sump. The condenser operates much like a reflux condenser wherein water within the shell is evaporated by the heaters and is condensed by the cool water flowing through the condenser tubes. The condensate returns by gravity flow to the bottom of the shell and is re-evaporated. Steam temperatures are determined by the amount of vacuum established in the condenser shell. Probes are used for shell side temperature and pressure as well as for inlet and outlet cooling water temperatures. The pH and conductivity control achieved with acid feed and blowdown in recirculating systems was simulated by pH and conductivity controllers. Scaling can be monitored by measuring: pH and calcium concentration of the cooling water; decreases in shell side vacuum along with the corresponding increase in shell side temperatures; decreases in the differences between inlet and outlet cooling water temperatures; and by visual inspection of the tube. Test conditions were: 400 ppm Ca as $CaCO_3$, 200 ppm Mg as $CaCO_3$, 240 ppm $NaHCO_3$, flow 6.0 gpm, pH 8.6, M alk 150, TDS 1612, Skin Temp 130° F., Bulk Temp 110° F., Skin LSI 2.04, Bulk LSI 1.79, heat flux 10,165 btu/hr.ft². As shown in Table 13, PESA at treatment levels of 500 ppb was as efficacious as 75 ppb of HEDP, providing complete inhibition of calcium carbonate fouling.

TABLE 13

Condenser Tests

| Treatment | Final Turbidity | Tube $CaCO_3$ | System $CaCO_3$ |
|---|---|---|---|
| None | 1.67 | 351 mg | 2296 mg |
| 75 ppb HEDP | 0.67 | 0 | 14 mg |
| 75 ppb PESA | 0.60 | 26 mg | 1876 mg |
| 150 ppb PESA | 0.58 | 3 mg | 1148 mg |
| 500 ppb PESA | 0.58 | 0 | 16 mg |
| 1.0 ppm PESA | 0.51 | 0 | 14 mg |

EXAMPLE 14

Table 14 summarizes data with respect to calcium carbonate inhibition in a bench scale recirculator system as described in Example 5 wherein a known Balanced Alkaline Treatment (BAT) non-chrome was employed. The test conditions were: 600 ppm Ca as $CaCO_3$, 200 ppm Mg as $CaCO_3$, 357 ppm $NaHCO_3$, 2 ppm Zinc, pH 8.5, M alk 220, Temp 120° F., 3 ppm TTA, flow rate 2.5 gpm, mild steel tube heat flux 15,600 btu/hr.ft², test duration 4–5 days. In testing without zinc, heavy corrosion resulted. Fouling and corrosion was controlled by a 3.25 ppm HEDP treatment. Equivalent results were obtained with a 1.0 ppm treatment level of PESA.

TABLE 14

BAT-Zinc Recirculator Tests

| Treatment | Final Turbidity | Tube Appearance | Corrosion Rate (mpy) |
|---|---|---|---|
| 21.5 ppm PESA | 0.50 | Clean | 0.16 |
| 10.0 ppm PESA | 0.50 | Clean | 0.5 |
| 5.0 ppm PESA | 0.56 | Clean | 0.78 |
| 2.0 ppm PESA | 0.48 | Clean | 1.07 |
| 1.0 ppm PESA | 0.59 | Clean | 1.86 |
| 21.5 ppm PESA, No Zinc | 2.08 | Heavy Corrosion | 20.18 |
| 10.0 ppm PESA, 2 ppm $Mo_4$ No Zinc | 0.62 | Heavy Corrosion | 32.28 |
| 10.0 ppm PESA, 20 ppm $Mo_4$ No Zinc | 1.04 | Heavy Corrosion | 29.9 |
| 20.0 ppm PESA, 30 ppm $Mo_4$ No Zinc | 5.1 | Moderate Corrosion | 16.7 |
| 21.5 ppm PESA, (2 days)* | 8.6 | Moderate Deposition | — |
| 40 ppm PESA (2 days)* | 2.4 | Moderate Deposition | — |
| 3.25 ppm HEDP | 0.49 | Clean | 0.64 |
| 3.25 ppm HEDP + 7.5 ppm Betz MHC | 0.44 | Clean | 0.87 |

EXAMPLE 15

Table 15 summarizes the results of static calcium oxalate inhibition testing which compares polyepoxysuccinic acid to a number of prior art calcium oxalate inhibitors at varying treatment levels. Test procedures were as described in Example 1 above. The conditions of the test were: 150 ppm Ca as $CaCO_3$; 100 ppm $C_2O_4$; 1% NaCl; pH 7 and 10; Temp. 60° C. As shown in Table 15 PESA is only slightly less efficacious than polyacrylic acid.

TABLE 15

Static Calcium Oxalate Inhibition

| Sample | ppm Active | % Inhibition |
|---|---|---|
| pH 7.0 | | |
| PESA | 1.0 | −5.0 |
| | 2.0 | −1.1 |
| | 5.0 | 27.8 |
| | 10.0 | 33.2 |
| Coag 88D | 1.0 | 33.2 |
| | 2.0 | 10.9 |
| | 5.0 | 32.5 |
| | 10.0 | 40.8 |
| Hexametaphosphate | 1.0 | −2.2 |
| | 2.0 | −1.8 |
| | 5.0 | 26.7 |
| | 10.0 | 15.5 |
| pH 10.0 | | |
| PESA | 1.0 | −5.2 |
| | 2.0 | 0.0 |
| | 5.0 | 34.3 |
| | 10.0 | 34.3 |
| | 25.0 | 35.3 |
| Coag 88D | 1.0 | 38.8 |
| | 2.0 | 5.2 |
| | 5.0 | 28.3 |
| | 10.0 | 25.9 |
| | 25.0 | 41.3 |
| Hexametaphosphate | 1.0 | −3.8 |
| | 2.0 | −3.8 |
| | 5.0 | 7.7 |
| | 10.0 | 2.8 |
| | 25.0 | 75.9 |

While this invention has been described with respect to particular embodiments thereof, it is apparent that numerous other forms and modifications of this invention will be obvious to those skilled in the art. The appended claims in this invention generally should be construed to cover all such obvious forms and modifications which are within the true spirit and scope of the present invention.

What is claimed is:

1. A method of controlling the formation and deposition of scale forming salts including calcium carbonate in a circulating aqueous system comprising introducing into said aqueous system a substoichiometric amount sufficient for the purpose of a treatment comprising a polyepoxysuccinic acid of the general formula

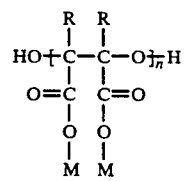

wherein n ranges from about 2 to about 50, M is hydrogen or a water soluble cation and R is hydrogen, $C_{1-4}$ alkyl or $C_{1-4}$ substituted alkyl.

2. The method of claim 1 wherein M is selected from the group consisting of Na+, NH4+, and K+.

3. The method of claim 1, wherein said polyepoxysuccinic acid is added to the aqueous system at active treatment levels ranging from about 25 parts per billion to about 500 parts per million.

4. The method of claim 3 wherein said polyepoxysuccinic acid is added to the aqueous system at active treatment levels ranging from about 50 parts per billion to about 100 parts per million.

5. The method of claim 1 wherein said aqueous system has a Langelier's Saturation Index of from about 0 to about 3.3.

6. The method of claim 1 wherein said aqueous system has a Langelier's Saturation Index of from about 2.5 to 3.0.

7. The method of claim 1 wherein n ranges from about 2 to about 25.

8. A method of inhibiting the formation of calcium scale including calcium carbonate in a circulating aqueous system comprising introducing into said aqueous system a substoichiometric amount sufficient for the purpose of a polyepoxysuccinic acid of the general formula

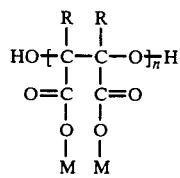

wherein n ranges from about 2 to about 50, M is selected from the group consisting of hydrogen, Na+, NH4+ and K+ and R is hydrogen, $C_{1-4}$ alkyl or $C_{1-4}$ substituted alkyl.

9. The method of claim 8 wherein said polyepoxysuccinic acid is added to the aqueous system at active treatment levels ranging from about 25 parts per billion to about 500 parts per million.

10. The method of claim 8 wherein said polyepoxysuccinic acid is added to the aqueous system at active treatment levels ranging from about 50 parts per billion to about 100 parts per million.

11. The method of claim 8 wherein said aqueous system has a Langelier's Saturation Index of from about 0 to about 3.0.

12. The method of claim 8 wherein said aqueous system has a Langelier's Saturation Index in the range 2.5 to 3.0.

13. The method of claim 8 wherein n ranges from about 2 to about 25.

14. A method of inhibiting the formation and deposition of scale including calcium carbonate and salts of barium in a circulating aqueous system comprising introducing into said aqueous system a substoichiometric amount sufficient for the purpose of a polyepoxysuccinic acid of the general formula

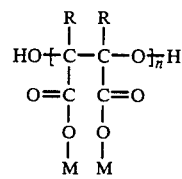

wherein n ranges from about 50, M is hydrogen or a water soluble cation and R is hydrogen, $C_{1-4}$ alkyl or $C_{1-4}$ substituted alkyl.

15. The method of claim 14 wherein n ranges from about 2 to about 25.

16. The method of claim 14 wherein M is selected from the group consisting of Na+, NH4+, and K+.

17. The method of claim 14 wherein said polyepoxysuccinic acid is added to the aqueous system at active treatment levels ranging from about 25 parts per billion to about 500 parts per million.

18. The method of claim 14 wherein said polyepoxysuccinic acid is added to the aqueous system at active treatment levels ranging from about 50 parts per billion to about 100 parts per million.

* * * * *